Patented Aug. 17, 1926.

1,596,233

UNITED STATES PATENT OFFICE.

CHESLEY MAXWELL BOGLE, OF SEATTLE, WASHINGTON.

CONCENTRATED SAUERKRAUT JUICE.

No Drawing.   Application filed May 20, 1925.   Serial No. 31,695.

The present invention has to do with a food or drink, new and unique in its nature, and derived as a by-product from another art.

Among the objects of invention are the following:

The production of a new food or drink, high in lactic acid bacteria;

The concentration and preservation of sauerkraut juice, while destroying its disagreeable taste and rendering it wholly palatable;

Concentrating sauerkraut juice in a manner permitting of its being restored to its normal strength in the hands of a consumer;

Provision of a method whereby sauerkraut juice may be concentrated without destruction to its food and medicinal values; and The production of a new beverage comprising the active portions of sauerkraut juice as a basis for its food and medicinal value as well as for its taste.

These, and such other objects as may hereinafter appear, are obtained by the novel process of concentration and manufacture hereinafter described.

Sauerkraut has for a long time been known to possess a high food value. Experiments with sauerkraut have disclosed that its liquid part is high in lactic acid ferment, comprises a relatively large acid content, and is strong in salt.

From such experiments, it has been determined that such juice possesses a wholesome food and active medicinal value. The great difficulty in providing the consuming public with this food product has been that it is dilute, hard to preserve, and in its ordinary form, unpalatable because of its cabbage taste.

As a result of research work and continued experiments, the process hereinafter to be described has been devised for the purpose of removing from sauerkraut juice the taste, for concentrating the juice, for its preservation, to increase its palatability and food value, and to treat it in a manner adapting it to a wide range of useful purposes.

Sauerkraut juice is obtained in the following manner. From the pulp portion of the sauerkraut the upper portion of the juice is drawn off and thrown away as useless. The juice for treatment is selected from the middle and lower sections of the kraut tank and should have approximately one and five-tenths (1.5) percent acidity and salometer reading of about 40 degrees. Juice having these primary requisites may be secured only from the middle and bottom of the tank, and the juice at the top of the tank is rejected because it does not possess a sufficient acidity or salt content.

The selected juice, having been decanted from the kraut tank, is strained. After straining, the strained juice is run into an open glass-lined kettle where the strained juice is boiled until it is reduced to the required density. The boiling is continued until the concentrated juice possesses about two and five-tenths (2.5) percentum acidity and approximately five and three-tenths (5.3) percentum of salt. Concentrated juice thus obtained and having the salt and acid content indicated should possess a bacteria count of over a billion.

When concentrated in the manner indicated and to the extent suggested, the juice has been concentrated or condensed from ten (10) parts to about three and three-tenths (3.3) parts. Such juice is of a syrupy consistence, and free from its original nasty cabbage taste.

The concentrated product in this condition is ready for bottling or for otherwise preparing for shipping. In its concentrated state, it may be employed for many purposes without dilution, but in order to return the juice to the original strength possessed by it prior to concentration, it is usual to add two parts of water to one part of the concentrated juice. This gives a juice of approximately the original acid and saline qualities.

From the concentrated form here described, a delightful carbonated drink may be obtained by adding thereto, a low carbonation, using carbon dioxide gas, and if the carbonated product is bottled, it is suitable for fountain use.

Experiments further show that the concentrated juice is practically free from any danger of spoiling. The heat treatment the juice receives pasteurizes the product and destroys the bacteria which might cause fermentation or putrefaction.

The condensed juice, either in its concentrated or undiluted form, or when diluted with a portion of water, is adapted to be consumed by drinking, the said condensed juice or the product obtained therefrom by dilution, having a pleasant saline-acid taste, and possessing a very high lactic acid ferment value. In its concentrated or syrupy state, the juice may be shipped more conveniently than when in a normal dilute condition. The product resulting from the process here described is not unlike, relatively, concentrated or condensed milk, for it may be restored to substantially normal strength but in a purified condition by dilution with water just as may be done with condensed milk. Neither sugar nor a preservative is necessary in the preservation of sauerkraut juice, and the juice obtained by the present process is the original substance, merely clarified, improved, and condensed.

I claim:—

1. As a new article of manufacture, strained sauerkraut juice having an approximate acidity of 1.5 percent and a salometer reading of approximately 40 degrees, condensed by boiling to an acidity of 2.5% and a salt content of 5.3%.

2. A new article of manufacture comprising sauerkraut juice taken from the middle and lower sections of a kraut tank, and condensed to about one third its normal volume.

3. The process of concentrating sauerkraut juice which includes the following steps: recovering the juice of sauerkraut from the middle and lower portions of a kraut tank, straining the juice thus recovered, and boiling the strained juice until its volume is reduced to one-third its original volume.

4. As a new article of manufacture, a beverage comprising concentrated sauerkraut juice diluted with carbonated water.

CHESLEY MAXWELL BOGLE.